Feb. 28, 1956 R. A. McCALLUM 2,736,422
ENDLESS FLIGHT CONVEYOR WITH READILY REMOVABLE FLIGHTS
Filed Aug. 26, 1952 2 Sheets-Sheet 2
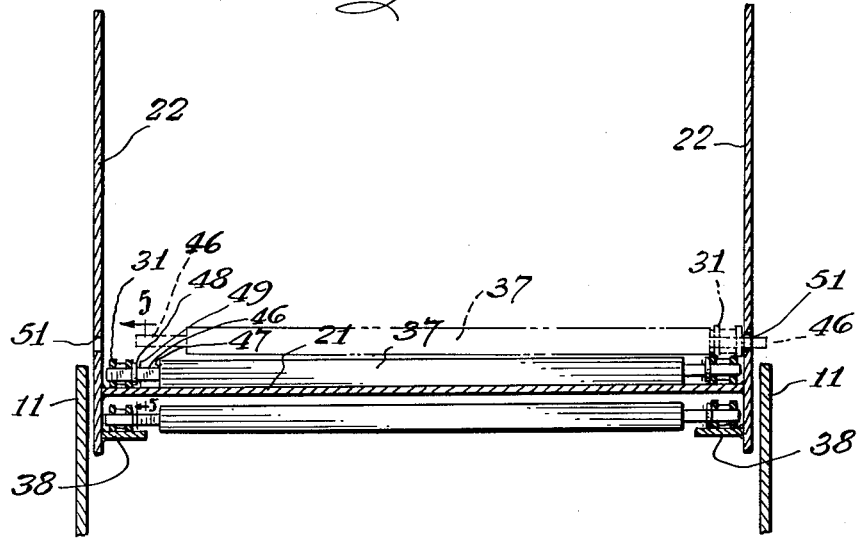
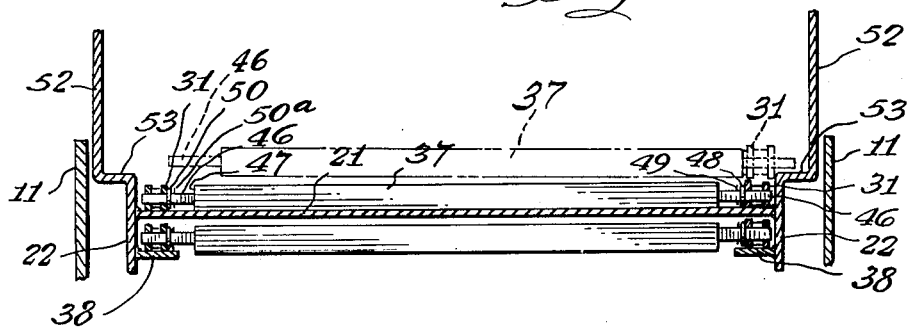
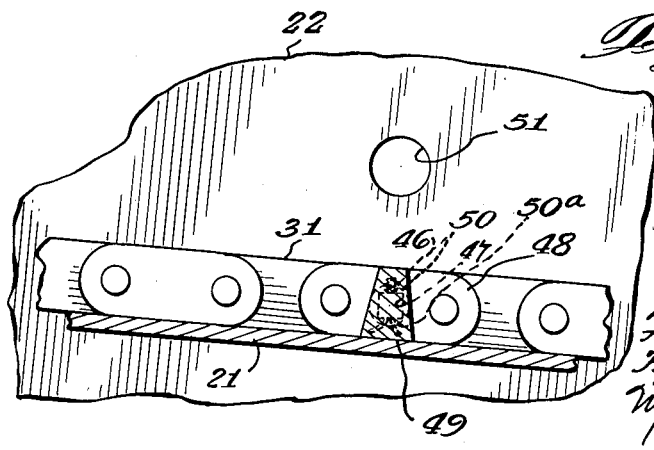
Inventor
Robert A. McCallum
By
Murray G. Gleeson
Attorney

United States Patent Office 2,736,422
Patented Feb. 28, 1956

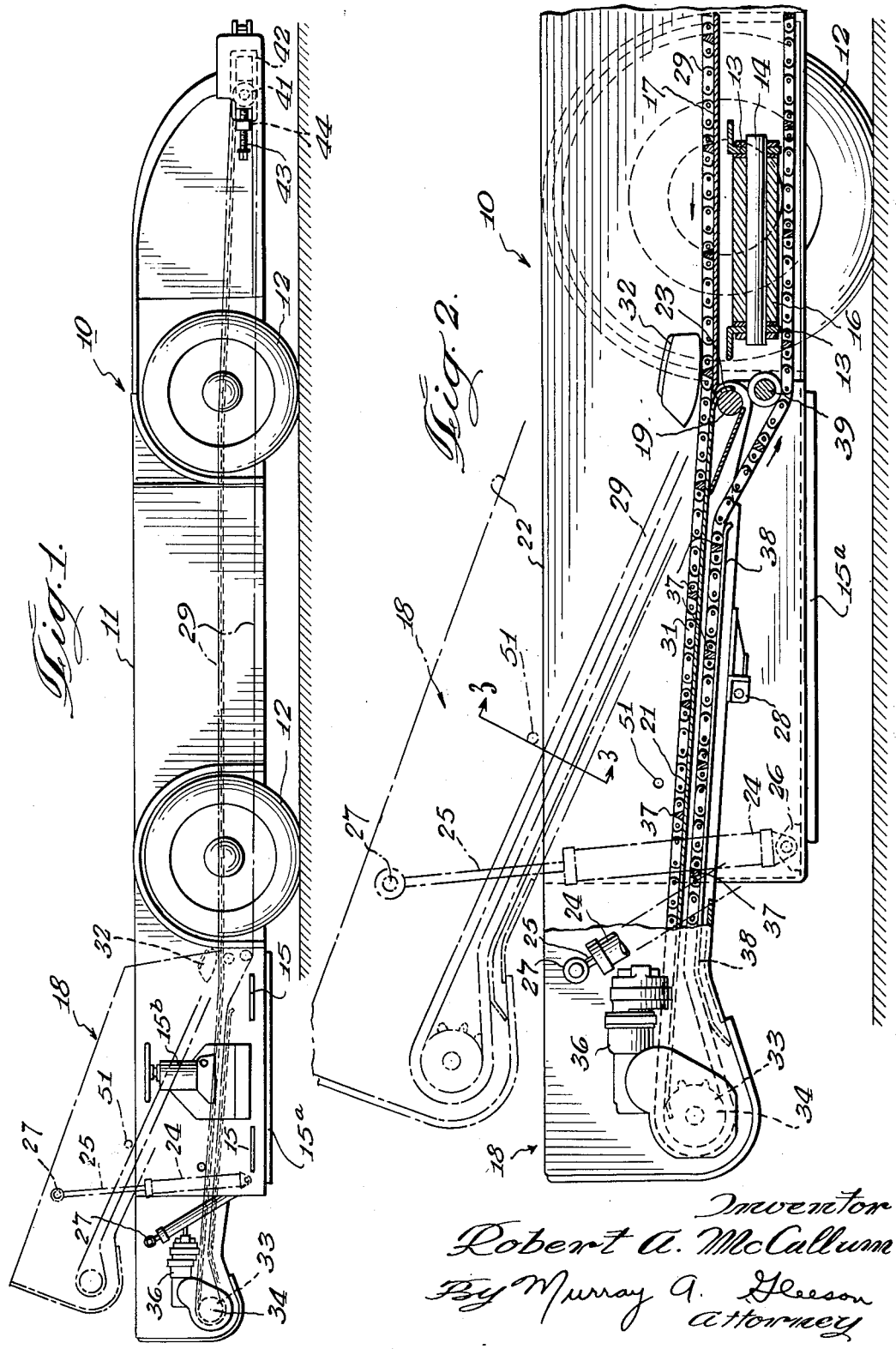

2,736,422

ENDLESS FLIGHT CONVEYOR WITH READILY REMOVABLE FLIGHTS

Robert A. McCallum, Clarendon Hills, Ill., assignor to Goodman Manufacturing Company, Chicago, Ill., a corporation of Illinois Application August 26, 1952, Serial No. 306,383

3 Claims. (Cl. 198—175)

This invention relates generally to haulage vehicles of the self unloading type, generally called shuttle cars, and of the type having a bed with a moving flight conveyor thereon. The invention relates more particularly to an improved construction for such a car whereby the worn flights may readily be replaced without disengaging the drive chains therefor.

In the shuttle cars of the prior art chain flight take up devices have been employed to give proper tensioning to the drive chains for the conveyor. In removing a worn or broken flight the conveyor is completely slackened off, and the chains with their worn or broken flight moved to a position at the end of the discharge section, at which point the chains are disconnected prior to replacing the flight. Since the flights in such conveyors are constructed so as to shoulder against the driving chains they can be removed from the chains only by disconnecting the chains and spreading them apart laterally while in position away from the conveyor.

According to the present invention, the flights are guided at their ends by the side walls of the conveyor bed, each end passing through a generally rectangular shaped broached or punched hole in the chain links, so that the flights will not turn while moving over the conveyor bed. Each flight may be made with a thicker cross section commencing at a point spaced from each end so as to present a suitable contour for transport of material. In the event the flight is worn or damaged, it need merely be lifted with the drive chain and then moved in an endwise manner through an opening in the side wall of the conveyor bed until the other end is freed from engagement with its associated driving chain. The other end may then be lifted and the flight moved endwise in the other direction to free same from the opposite drive chain, a reverse set of operations then taking place to insert a new flight. Both sets of operations may often be carried out without slackening the chain tension at all.

In another embodiment of the invention the flight conveyor travels between the usual side guides but the walls above the side guides are offset outwardly so that one side may be raised as described above and the worn flight removed by endwise movement in two directions as described above.

It is a principal object of the invention to afford a construction for a flight conveyor whereby a worn or broken flight may readily be removed from engagement with the driving chains without the need of slackening or disassembling the driving chains, and without removing the driving chains from the vehicle.

Other objects and important features of the invention will be apparent from a study of the specification following taken with the drawings which together show a number of preferred embodiments of the invention and what is now considered to be the best modes of applying the principles thereof. Other embodiments of the invention will be suggested to those having the benefit of the teachings of the within specification, and it is therefore intended that such other embodiments fall within the scope of the invention, especially as such other embodiments are embraced by the claims subjoined.

In the drawings:

Fig. 1 is a side view of a mine haulage vehicle having embodied therein the improvements according to the present invention;

Fig. 2 is a fragmentary side view thereof showing an elevating discharge section of the vehicle in raised position;

Fig. 3 is a section taken along the line 3—3 of Fig. 2 looking in the direction of the arrows and showing certain details of the improvements according to the present invention;

Fig. 4 is a view similar to Fig. 3, but showing another embodiment of the invention; and Fig. 5 is a side elevation view of a portion of the elevating discharge section looking in the direction of the arrows 5—5 of Fig. 3.

Referring now to the drawings, the improvements according to the present invention are embodied within a shuttle car indicated generally by the reference numeral 10. Said shuttle car has spaced side main frame members 11 and is provided with pneumatic-tired wheels 12, which may be driven and steered by any suitable mechanism well known in the art. The wheels 12 are connected to the main frame members 11 in any suitable manner but in the form of the shuttle car shown herein the spaced main frame members 11 are spanned by angles 13, 13. A pivot pin 14 spans the angle members 13, 13, and a pivotal cross axle 16 has the spaced wheels 12 mounted at each end thereof. The cross axle 16 provides a pivotal equalizing bar or axle for driving stub axles, not shown, providing driving torque to the wheels 12. Such a wheel equalizing structure is old in the art and need not be further described.

The vehicle 10 may be controlled from operators' seats 15 disposed on a side platform 15ª extending alongside of one of the side frame members 11. A control 15ᵇ for steering and other functions of the vehicle 10 is disposed on the platform 15ª and is arranged to be operated from either seat 15.

A material carrying compartment extends substantially the full length of the shuttle car 10 and extends between the side frame members 11. The material carrying compartment is defined by a bottom plate 17 extending between the side frame members 11 and terminating at the rear end of a vertically movable conveyor section indicated generally by the reference numeral 18. Said conveyor frame section is hinged on a suitable transverse pivot pin 19 having its end supported on the side frame members 11, 11.

The vertically movable discharge section 18 is guided for vertical movement between the upright side frame members 11, and has a floor plate 21 and upright side walls 22, together forming a trough-line extension of the material carrying compartment. The floor plate 21 forms a continuation of the bottom plate 17 of the material carrying compartment in all positions of the vertically movable discharge section 18. The rear end of the floor plate 21 is curved at 23 around the pivot pin 19, and the front end of the floor plate 17 meets with the curved portion with but a slight clearance therebetween so as to minimize the escape of fine material at the juncture of the two floor plates 17 and 21 in the various positions of the discharge section 18.

The discharge section 18 is raised and lowered by lifting cylinders 24 pivotally connected at 26 to the outside of the fixed frames 11. Each cylinder 24 includes a piston rod 25 pivotally connected at 27 to the elevating discharge section 18. The operator of the vehicle may control any suitable means for admitting fluid under pressure to the lifting cylinders.

A cross member 28 spanning the distance between the side frames 11 limits the movement in a lowering direction of the discharge section 18.

An endless flexible flight conveyor 29 has a pair of drive chains 31, 31, each moving alongside of the side frames 11 and 22 and on the floor plates 17 and 21. A hold down member 32 is secured on the inside of the vertical side plates 22 of the elevating discharge section 18 just above the pivot pin 19 and holds the flight conveyor 29 down during all positions of the discharge section 18.

The drive chains 31 are trained over drive sprockets 33 mounted on a shaft 34 driven from a fluid motor 36. A fluid pressure system, the same supplying power to the lifting cylinders 24, and not shown, operates the fluid motor 36.

The drive chains 31 are spanned by flights 37 which move with the chains 31 along the bottom plates 17 and 21 to turn around the drive sprockets 33, the return reach of the drive chains 31 of the flights 37 being guided over lower floor rails 38 underlying the bottom plate 21 and extending inward from the side frames 22, as seen more clearly in Fig. 3. The return reach is further guided past an idler roller 39 underlying the pivot pin 19 and so positioned as to guide the return reach beneath the equalizer bar 16 and the angle members 13, 13.

At the rear end of the shuttle car 10 the return reach is trained around an idler shaft 41 adjusted in its position in a pair of shaft holders 42 mounted on each side frame 11 at the rear end of the car. The flight conveyor then turns about the idler shaft 41 to move in the conveying direction over the bottom plate 17 of the fixed section. Proper tension is given to the flight conveyor 29 by a screw 43 threaded to each shaft holder 42 at 44 and bearing against the idler shaft 41. It will be seen that turning the screw 43 will adjust the position of the idler shaft 41 and the degree of tension on the drive chains 31.

According to the present invention it is unnecessary to release all of the tension in the drive chains 31 and open one of the links of the chains 31 for removing a broken or worn flight 37. To this end the flights 37 are dimensioned in such a fashion as readily to be slipped out of engagement with the drive chains 31, and the side walls of the conveyor section 18 are arranged to enable such removal of the flight 37.

As seen particularly in Fig. 3, each flight 37 has ends 46 of reduced cross sectional area, the cross section being generally square or rectangular. Each end 46 is engaged in a punched or broached hole 47 in a link 48 of the drive chain 31. The flight 37 is generally trapezoidal shaped in cross section over the remainder of its length to present a bottom surface 49 which rides upon the bottom plate 21.

A shoulder 47 is formed on the flight 37 where the flight end 46 extends, the latter being substantially equal in length to twice the width of the drive chain 31. A washer 50 and a cotter pin 50ª prevent the chain 31 from moving inwardly against the shoulder 47, so that at all times the chains 31 move along the inside of the side frame members 11 and 22 and in alignment with the driving sprockets 33, and so that material transported along the bottom plates 21 and 17 will not be wedged between the chains 31 and the side frames 11 and 22.

Opposite openings 51 are provided in the side walls 22 of the movable discharge section 18. These openings are arranged a slight distance above the drive chains 31 and in such a fashion as to receive the flight end 46 for each removal of the flight 37 from the driving chain 31.

In removing a worn or broken flight 37 the movable discharge section 18 is raised until the opposite openings 51 are in a position above the side frame members 11. If necessary, but this is usually not the case, the driving chains are slackened by backing off the take-up screws 43 which enables the idler 41 to move to the left as seen in Fig. 1. The cotter pins 49 are removed from the flight ends 46, and one of the drive chains 31 is lifted so that the flight end 46 may enter the adjacent opening 51 by sliding the flight 37 end for end. There is always enough slack in a chain, even when under full tension, that it can be lifted a certain amount. Normally this is sufficient to permit the flight to be aligned with the opening 51 without releasing tension by means of adjusting screws 43. The opposite end of the flight 37 is thus released from the opposite drive chain 31, and by raising the opposite end after such release the flight 37 may then be moved end for end in the opposite direction into the opposite opening 51 so that it will be released from the other chain 31 in the manner more clearly seen in Fig. 3.

In Fig. 4 there is shown another embodiment of the invention. In this form the side frame members 22 are offset outwardly to make upper side frame portions 52 connected by a generally horizontal ledge 53. In order to make the elevating discharge section shown in Fig. 4 fit within the main carrying compartment defined by the side frame members 11 and bottom plate 17 of Figs. 1 and 2, the side frame members 11 thereof are likewise offset.

Such a construction as shown in Fig. 4 enables the individual flights 37 to be removed when desired at any point along the upper run of the flight conveyor and without the need of raising discharge section 18 as in the embodiment shown in Fig. 3. Also, by such a construction it is not necessary to bring the worn or broken flight opposite the apertures 51 as shown in Fig. 3. In the form of the invention shown in Fig. 4, the flight conveyor 29 is first slackened off if necessary by the tension adjusting screw 43. One of the drive chains 31 is then lifted to a position whereby the flight 37 may be moved in endwise fashion to be released from engagement with the opposite drive chain 31. As seen in Fig. 4 the opposite end of the flight 37 may then be lifted above the bottom plate 21 and then moved endwise in an opposite direction until it is released from engagement with the first drive chain.

The reverse operations, of course, take place to install a new flight 37 to position of engagement by the drive chains 31.

While the invention has been described in terms of more than one embodiment thereof, it will be understood that other constructions and arrangements may be suggested. The scope of the invention, therefore, is intended not to be limited by the embodiments herein shown and only by the terms of the claims here appended.

I claim:

1. In a shuttle car having a frame including side frame members and a floor plate defining a material carrying compartment, an endless conveyor movable along said floor plate and including a pair of driving chains movable along said side members with flights connected to said driving chains and movable thereby, said endless conveyor being characterized by being confined on both the conveying and return reaches thereof between said side frame members, each of said flights extending substantially for the distance between said side frame members, each of said driving chains being essentially rigid in planes parallel to said floor plate, said flights having flight ends of reduced cross sectional area, each of said flight ends being of a length which is approximately twice the width of one of said driving chains, means disposed along said frame for enabling one of said drive chains together with a flight to be lifted from said floor plate and said flight moved in endwise fashion a distance sufficient for disengagement of a flight end with an opposite driving chain, and for enabling the so freed flight to be moved in an opposite endwise direction for disengagement of the first named flight end with the said one drive chain, and means supported by each of said flight ends of reduced cross sectional area for holding the driving chains against said side frame members to prevent material being transported from being wedged between the driving chains and the side frames.

2. In a shuttle car having a frame including side frame members and a floor plate defining a material carrying compartment, an endless conveyor movable along said floor plate and including a pair of driving chains movable along said side frame members with flights connected to said driving chains and movable thereby, said endless conveyor being characterized by being confined on both the conveying and return reaches thereof between said side frame members, each of said flights extending substantially for the distance between said side frame members, each of said driving chains being essentially rigid in planes parallel to said floor plate, said flights having flight ends of reduced cross sectional area, each of said flight ends being of a length which is approximately twice the width of one of said driving chains, an opening in each of said frames, one of said drive chains together with a flight being capable of being lifted from said floor plate so that said flight may be moved in endwise fashion whereby said flight end may enter said opening a distance sufficient for disengagement of an opposite flight end with the other driving chain, the so freed flight being then moved in an opposite endwise direction for disengagement of the first named flight end with the said one driving chain, and means supported by each of said flight ends of reduced cross sectional area for holding the driving chains against said side frame members to prevent material being transported from being wedged between the driving chains and the side frames.

3. In a shuttle car having a frame including side frame members and a floor plate defining a material carrying compartment, an endless conveyor movable along said floor plate and including a pair of said driving chains movable along said side frame members with flights connected to said driving chains and driven thereby, said endless conveyor being characterized by being confined on both the conveying and return reaches thereof between said side frame members, said flights extending substantially for the distance between said side frame members, each of said driving chains being essentially rigid in planes parallel to said floor plate, each of said side frame members having offset walls thus providing a ledge above said driving chains, said flights having flight ends of reduced cross sectional area, each of said flight ends being of a length which is approximately twice the width of one of said driving chains, one of said drive chains together with said flight being capable of being lifted from said floor plate, and said flight being adapted to move in endwise fashion along said ledge a distance sufficient for disengagement of a flight end with an opposite driving chain, the so freed flight being capable of being moved in an opposite direction for disengagement of the first named flight with the said one drive chain, and means supported by each of said flight ends of reduced cross sectional area for holding the driving chains against said side frame members to prevent material being transported from being wedged between the driving chains and the side frames.

References Cited in the file of this patent

UNITED STATES PATENTS

| | | |
|---|---|---|
| 1,867,510 | Kershaw et al. | July 12, 1932 |
| 2,546,262 | Hatcher | Mar. 27, 1951 |
| 2,575,610 | Ball | Nov. 20, 1951 |
| 2,592,532 | Beck | Apr. 15, 1952 |